J. W. Mahlon,
Vise.
No. 109,747. Patented Nov. 29, 1870.
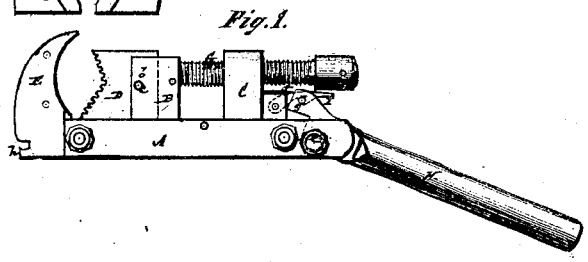
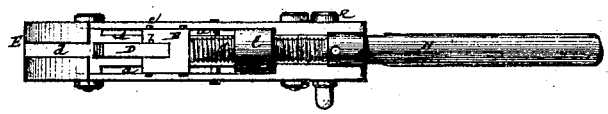
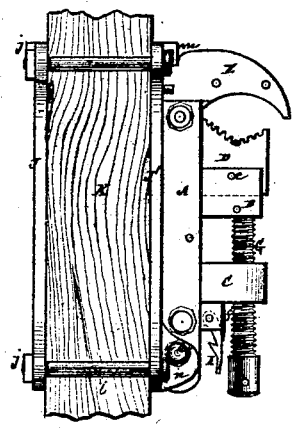 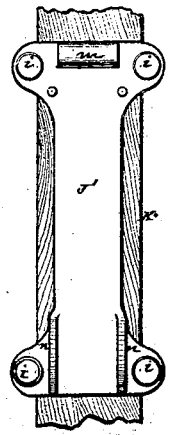
Witnesses:
Fred Haynes
R. I. Rabeau
James W. Mahlon

United States Patent Office.

JAMES W. MAHLON, OF BROOKLYN, NEW YORK.

Letters Patent No. 109,747, dated November 29, 1870.

---

IMPROVEMENT IN DEVICES FOR CLAMPING OR CUTTING OFF TUBES AND RODS.

---

The Schedule referred to in these Letters Patent and making part of the same.

---

*To all whom it may concern:*

Be it known that I, JAMES W. MAHLON, of Brooklyn, in the county of Kings and State of New York, have invented a new and useful Combined Tongs, Vise, and Pipe-Cutter, of which the following is a full, clear, and exact description, reference being had to the accompanying drawing forming part of this specification, and in which—

Figure 1 represents a side view of my improved tool, with its parts arranged to form a pipe-tongs, or, by the insertion of cutters, such as shown in fig. 2, with its parts arranged to form a pipe-cutter, and Figure 3, a front edge view of the same.

Figure 4 represents a side view of the tool, in connection with a clamp, when the same is designed to be used as a vise; and Figure 5, a front view of the said clamp.

Similar letters of reference indicate corresponding parts.

My invention consists in a tool mainly designed for gas-fitters' and plumbers' use, which shall be readily convertible either into a pipe-tongs, a pipe-cutter, or a vise for holding gas-pipe in the course of finishing or repairing it, said tool embracing a fixed slotted claw or jaw at the end of the tool-stock, a sliding jaw or cutter-holder, adjustable toward or from the fixed claw by means of a screw which works through a box that is free to slide upon the stock, and is controlled by the working of the handle in the operation of the tool as a tongs or pipe-cutter.

The invention also includes a peculiarly-constructed clamp and tool-stock, to allow of the conversion of the tool into a vise.

Referring, in the first instance, to figs. 1, 2, and 3 of the drawing—

A represents the stock of the tool, made in sections or slotted, as at *a a*, to provide for the fit therein and on, of the sliding jaw or cutter-holder B and screw-box C.

In using the tool as a pipe-tongs, a serrated jaw, D, is let into a slot, *b*, made in the holder B, and securely retained therein by means of a cross-pin, *c*, said jaw being arranged to face a slot, *d*, in the fixed claw E, at the outer end of the stock, so that said jaw D may be made to enter at its projecting ends the slot *d* when the tongs are required to gripe a pipe of very small size.

The slot *d* also serves to hold a cutter, F, and the slot *b* in the holder B, a corresponding cutter, F', in place of the jaw D, when it is required to use the tool as a pipe-cutter. Said cutters may either be of the form here shown, or of any other suitable shape and description.

The holder B, with its jaw D or cutter F', is adjusted toward the claw E or cutter F, when the tool is being used as a pipe-cutter, to establish gripe of the pipe by means of a screw, G, which works through the screw-box C, that is made capable of a separate sliding action upon the stock, carrying the holder B along with it by means of the handle H, pivoted, as at *e*, to the stock, and pressing with a cam-like action on or against the back of the screw-box C, or projection therefrom, to move the holder B toward the fixed claw E when the tool is worked in one direction, but relieving itself from pressure on the screw-box when the tool is worked in the opposite direction.

This action of the handle effects for the tool its necessary operation on the pipe, as, for instance, in screwing or unscrewing two lengths or sections together, by restricting the gripe to movement in one direction only of the tool where there is not room to swing the tool an entire circle, but in cases where there is room for such a whole sweep of the tool, the construction of the latter admits of its being so used.

To prevent rattle or shake in a back swing of the tool, the handle H may be connected with the sliding screw-box C by a hook, I, pivoted to said box, and borne down by a spring, *f*, to make the hook catch on or over a pin, *g*, secured to the handle. This in no way interferes with the cam-like action of the handle to work the screw-box C and holder B forward, but draws said box and holder back, free from rattle or shake in the return stroke of the handle.

The tail-end of the hook I is made to project through the handle, to allow of said hook being disconnected from the handle, when required.

To convert the tool into a vise, the utility of which in places away from the work-shop will be found very serviceable, as, for instance, when required to shorten a length of pipe and to cut a screw-thread thereon, I provide, as a necessary element in the combination, a clamping attachment that can be conveniently secured to any upright or other post without boring or drilling. For this purpose the stock A is made with a lip, *h*, at its back or outer end, and a clamp, consisting of a back plate, J, and a front plate, J', (see figs. 4 and 5,) is firmly secured to any convenient post, K, by means of side bolts and nuts *i j*.

The front plate J' of this clamp is provided at its one end with a clip or lip-shaped projection, *m*, and at its other end with side lugs or ears *n n*, so that the stock A of the tool may be fitted, by its lip *h*, into lock within or under the clip *m*, and the pivot-pin *e* of the handle be projected through and secured to the side lugs *n n*, with or without the handle H in its place.

Under this condition or arrangement of the parts the holder B, with the jaw D, forms the movable portion of the vise, and which is adjustable by the screw G, while the claw E forms the fixed portion thereof.

A tool combining, as this does, three different implements in one, will be found very convenient by gas-fitters and others, and, in avoiding a multiplicity of tools, prove decidedly economical.

What is here claimed, and desired to be secured by Letters Patent, is—

1. The combination of the stock A, having a lip, h, on the one end, the clamping-plates J J' united by bolts and nuts, the clip m, side lugs n n, and bolt e, the whole arranged and operating substantially as and for the purpose herein set forth.

2. The improved machine herein described, adapted to the interchangeable uses of holding and cutting off pipe.

JAMES W. MAHLON.

Witnesses:
FREDK. HAYNES,
R. E. RABEAU.